(12) United States Patent
Bastue et al.

(10) Patent No.: US 7,180,590 B2
(45) Date of Patent: Feb. 20, 2007

(54) TRANSMISSION SPECTROMETER WITH IMPROVED SPECTRAL AND TEMPERATURE CHARACTERISTICS

(75) Inventors: Jens Bastue, Frederiksberg (DK); Nicolai Herholdt-Rasmussen, Copenhagen (DK); Michael Rasmussen, Bronshoj (DK); Ole Jespersen, Vallensbæk Strand (DK)

(73) Assignee: Ibsen Photonics A/S, Farum (DK)

( * ) Notice: Subject to any disclaimer, the term of this patent is extended or adjusted under 35 U.S.C. 154(b) by 518 days.

(21) Appl. No.: 10/616,398

(22) Filed: Jul. 9, 2003

(65) Prior Publication Data

US 2005/0007586 A1    Jan. 13, 2005

(51) Int. Cl.
*G01J 3/28* (2006.01)

(52) U.S. Cl. ............... 356/326; 356/328; 359/566; 359/569

(58) Field of Classification Search ......... 356/326, 356/328; 359/566, 569, 572; 385/37, 24, 385/16
See application file for complete search history.

(56) References Cited

U.S. PATENT DOCUMENTS

| | | | |
|---|---|---|---|
| 4,634,624 A | 1/1987 | Tajima et al. | |
| 4,856,172 A | 8/1989 | Ahmed et al. | |
| 5,042,898 A | 8/1991 | Morey et al. | |
| 5,424,827 A * | 6/1995 | Horwitz et al. | 356/328 |
| 5,559,597 A | 9/1996 | Battey et al. | |
| 5,615,010 A | 3/1997 | Kraiczek et al. | |
| 6,522,403 B2 * | 2/2003 | Wilson et al. | 356/328 |
| 6,570,652 B1 * | 5/2003 | Cappiello | 356/328 |
| 6,583,934 B2 * | 6/2003 | Kramer | 359/569 |
| 6,765,724 B1 * | 7/2004 | Kramer | 359/566 |
| 6,891,676 B2 * | 5/2005 | Ford et al. | 359/572 |
| 6,954,271 B2 * | 10/2005 | Curtiss | 356/328 |
| 2002/0135876 A1 * | 9/2002 | Holm et al. | 359/566 |
| 2002/0181128 A1 | 12/2002 | Beattie et al. | |
| 2003/0007148 A1 * | 1/2003 | Moon et al. | 356/328 |
| 2003/0067645 A1 * | 4/2003 | Ibsen et al. | 359/124 |

FOREIGN PATENT DOCUMENTS

| | | |
|---|---|---|
| WO | WO 01/95539 | 12/2001 |
| WO | WO 03/003531 | 1/2003 |

OTHER PUBLICATIONS

Patent Abstracts of Japan: Publication No. 10307203 (Feb. 26, 1999), vol. 1999, No. 2, Nov. 17, 1998, 1 page.

\* cited by examiner

*Primary Examiner*—Layla G. Lauchman
(74) *Attorney, Agent, or Firm*—Altera Law Group, LLC

(57) ABSTRACT

Transmission spectrometers require low levels of background light so that the signal to noise ratio is increased, and also require stable performance over wide temperature ranges. Light reflected by the transmission grating can result in increased background levels. One approach to reducing the background level is to orient the transmissive diffraction grating so that light reflected by the grating is reflected out of the diffraction plane. The temperature-induced wavelength drift of a transmission spectrometer can be due to the frame upon which the transmission grating is mounted. The wavelength drift is reduced by allowing the thermal expansion of the grating to be independent of the frame.

52 Claims, 8 Drawing Sheets

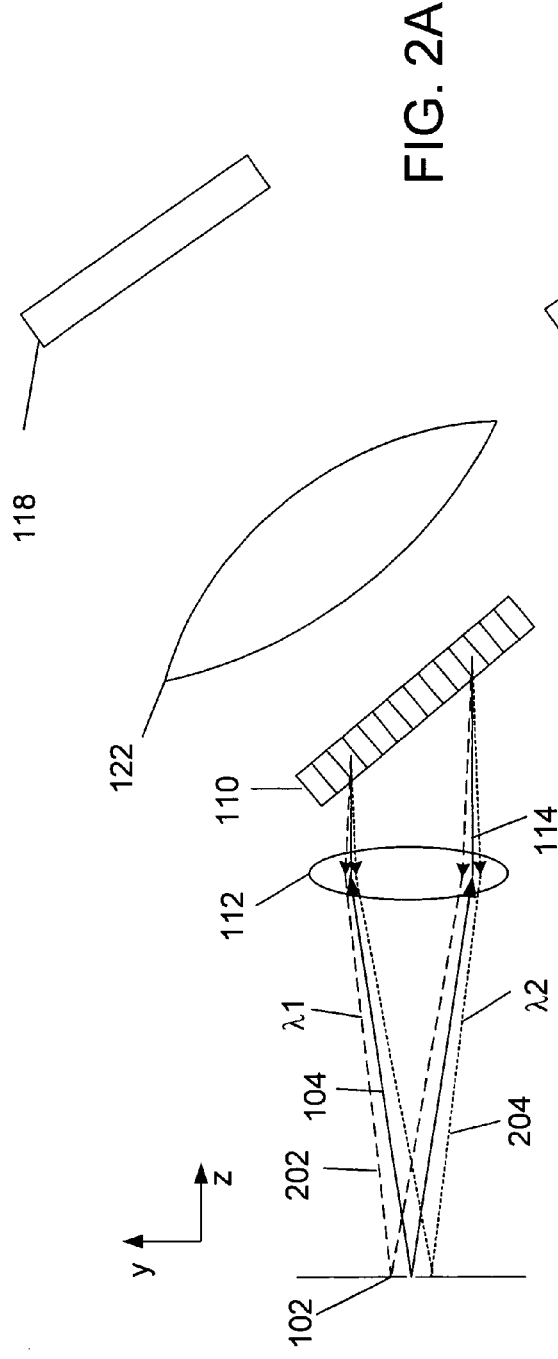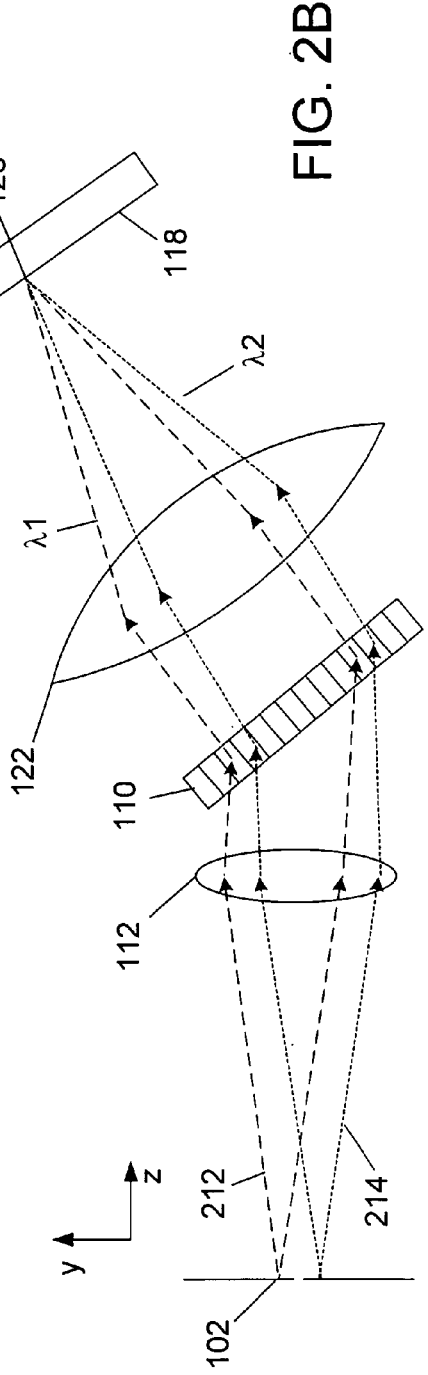

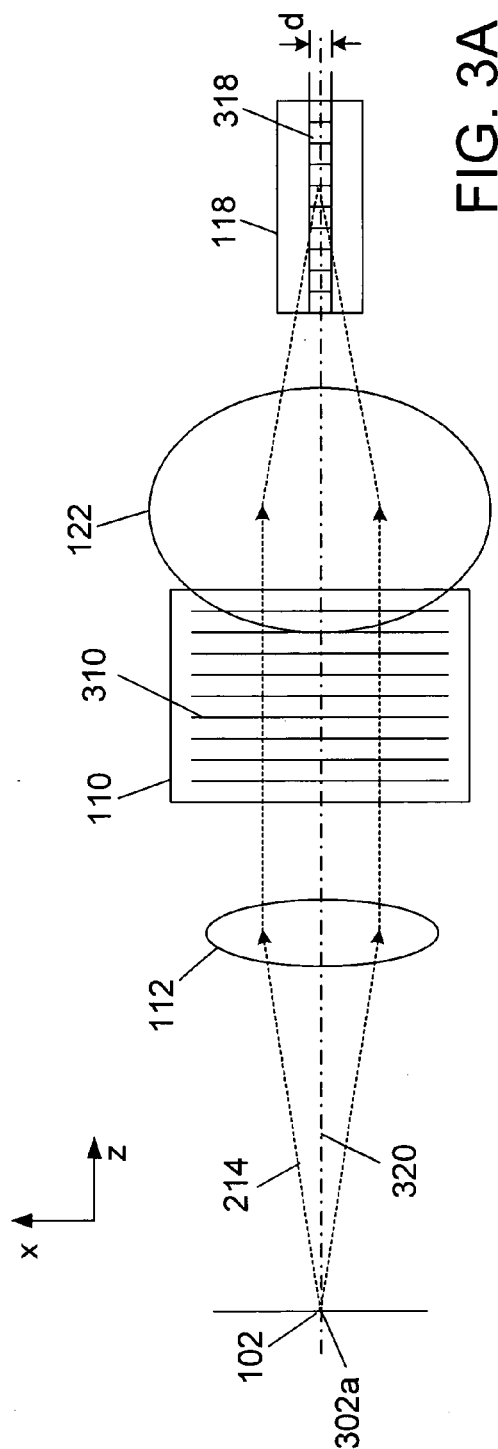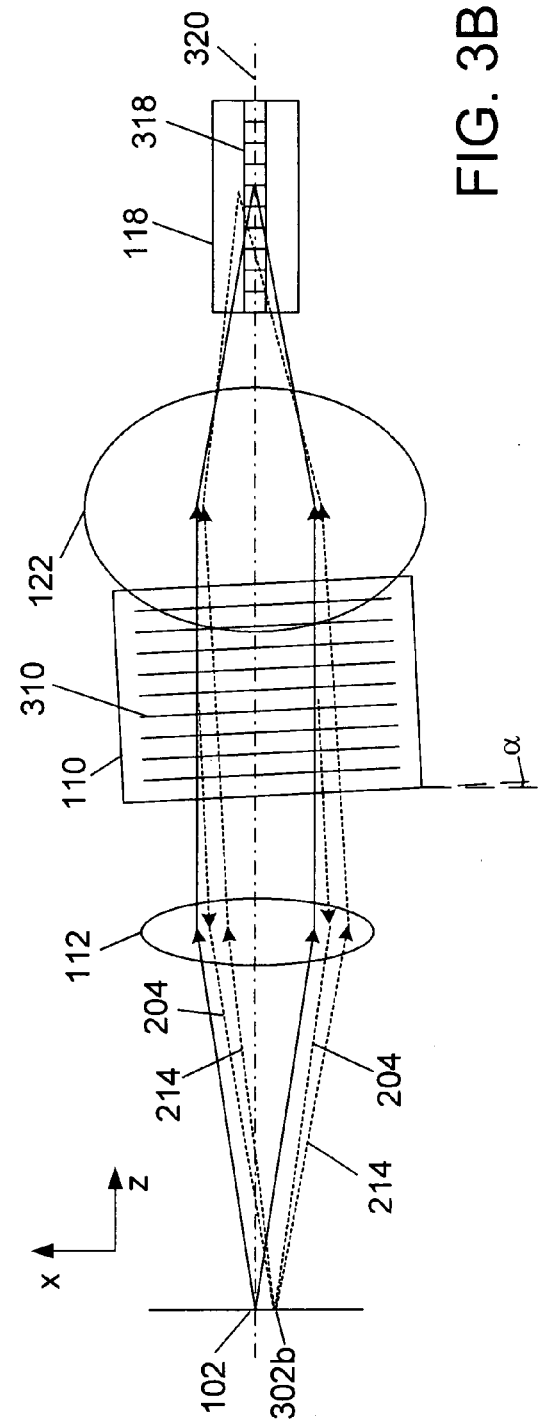

temp = T0 temp > T0

TRANSMISSION SPECTROMETER WITH IMPROVED SPECTRAL AND TEMPERATURE CHARACTERISTICS

FIELD OF THE INVENTION

The present invention is directed generally to optical systems, and more particularly to an optical spectrometer that uses a transmissive diffraction grating.

BACKGROUND

Optical spectrometers are useful devices for analyzing the spectral content of a beam of light. A spectrometer uses a dispersing element, for example a diffraction grating or a prism to spatially separate different wavelengths of light. A spatially sensitive detector arrangement is then used to detect the dispersed light. One type of spatially sensitive detector arrangement uses a detector array to detect the dispersed light.

For increased sensitivity, it is important to be able to increase the signal to noise ratio. In many applications, particularly where the amount of light fed into the spectrometer is limited, the signal to noise ratio may be increased by reducing the amount of background noise. This may be achieved, for example, by reducing the amount of unwanted light reaching the detector.

The temperature-related behavior of the spectrometer can be an important characteristic to control. For example, in some spectrometers the apparent wavelength of the detected light drifts with temperature, and so these spectrometers have to be operated at constant temperature in order to maintain the accuracy of the measurement. This severely limits the use of the spectrometer in certain applications where the temperature is not easily controlled, or is expensive to control.

SUMMARY OF THE INVENTION

One type of scattered light that it is particularly important to reduce is light that is scattered within the spectrometer from the diffraction element. For a transmissive diffracting element, such as a diffraction grating, a portion of the incident light is reflectively diffracted. This light may propagate within the spectrometer and be incident on the detector if not properly controlled. One approach to reducing the effect of reflectively diffracted light in the spectrometer is to orient the diffraction grating so that the light is reflected out of the plane of the detected light.

Another aspect of good performance of a transmission spectrometer is that it behaves uniformly over a range of temperatures. The diffraction element, when attached to a frame, often warps or stretches when the temperature changes. This results in a shift and/or defocusing of the light at the detector, thus leading to a degradation of the spectral performance of the spectrometer. One approach to reduce the grating's temperature-dependent behavior is to mount it in a manner that permits independent thermal expansion and contraction of the grating and the frame when the temperature changes. This reduces the temperature-related stresses that occur when the temperature changes, and so the associated drift with temperature is reduced. As a result, the temperature range over which the spectrometer can operate with high accuracy is increased.

Consequently, one embodiment of the invention is directed to an optical spectrometer having an input port, an optical detector and at least a first transmissive diffraction grating disposed to diffract light received from the input port to the optical detector. Light from the input port is diffracted parallel to a diffraction plane. The first transmissive diffraction grating is oriented so that light reflected by the first transmissive diffraction grating is reflected in a direction non-parallel to the diffraction plane. A first focusing unit is disposed between the first transmissive diffraction grating and the optical detector. The first focusing unit focuses light from the first transmissive diffraction grating to the optical detector.

Another embodiment of the invention is directed to an optical spectrometer that comprises an input port, an optical detector defining an active aperture and at least a first transmissive diffraction grating disposed to diffract light received from the input port to the optical detector. A first focusing unit is disposed between the first transmissive diffraction grating and the optical detector. The first focusing unit focuses light from the first transmissive diffraction grating to the optical detector. The first transmissive diffraction grating is oriented so that light, reflected from the transmissive diffraction grating and reflected back through the transmissive diffraction grating, reaches a focal plane of the first focusing unit outside the active aperture.

Another embodiment of the invention is directed to a method of aligning a spectrometer having at least a first transmissive diffraction grating. The method includes passing light from an input port to the first transmissive diffraction grating and diffracting the light in a diffraction plane by the first transmissive diffraction grating. The light diffracted by the first transmissive diffraction grating is focused to a detector defining an active aperture. The first transmissive diffraction grating is oriented so that light reflected by the first transmissive diffraction grating is reflected out of the diffraction plane.

Another embodiment of the invention is directed to a spectrometer that comprises an input port, an optical detector and at least a first transmissive diffraction grating unit disposed to diffract light received from the input port to the optical detector. Light from the input port is diffracted parallel to a diffraction plane. The first transmissive diffraction grating unit comprises a transmissive diffraction grating attached to a frame using a mounting, the mounting permitting independent thermal expansion and contraction of the grating and the frame under conditions of changing temperature. A first focusing unit is disposed between the optical detector and the first transmissive diffraction grating unit. The first focusing unit focuses diffracted light from the first transmissive diffraction grating unit to the optical detector.

Another embodiment of the invention is directed to a method of mounting a transmissive diffraction grating to a frame. The method comprises attaching the transmissive diffraction grating to the frame while permitting independent thermal expansion and contraction of the transmissive diffraction grating and the frame under conditions of changing temperature.

Another embodiment of the invention is directed to a spectrometer that comprises an input port, an optical detector and at least a first transmissive diffraction grating unit disposed to diffract light received from the input port to the optical detector. The first transmissive diffraction grating unit comprises a transmissive diffraction grating attached to a frame using a mounting. A first focusing unit is disposed between the optical detector and one or more transmissive diffraction grating units of the at least one transmissive diffraction grating unit. The first focusing unit focuses diffracted light to the optical detector. The at least one diffraction grating unit, the first focusing unit and the optical detector are arranged to operate at light wavelengths in excess of 100 nm, and the temperature dependent wavelength shift of diffracted light at the optical detector is no more than 0.01 nm/K.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 2A and 2B schematically illustrate an embodiment of a spectrometer using a transmissive diffraction element;

FIG. 3A schematically illustrates a perpendicular view of the spectrometer of FIGS. 2A and 2B.

FIG. 3B schematically illustrates a perpendicular view of an embodiment of a spectrometer using a transmissive diffraction element according to principles of the present invention;

Figure 1:
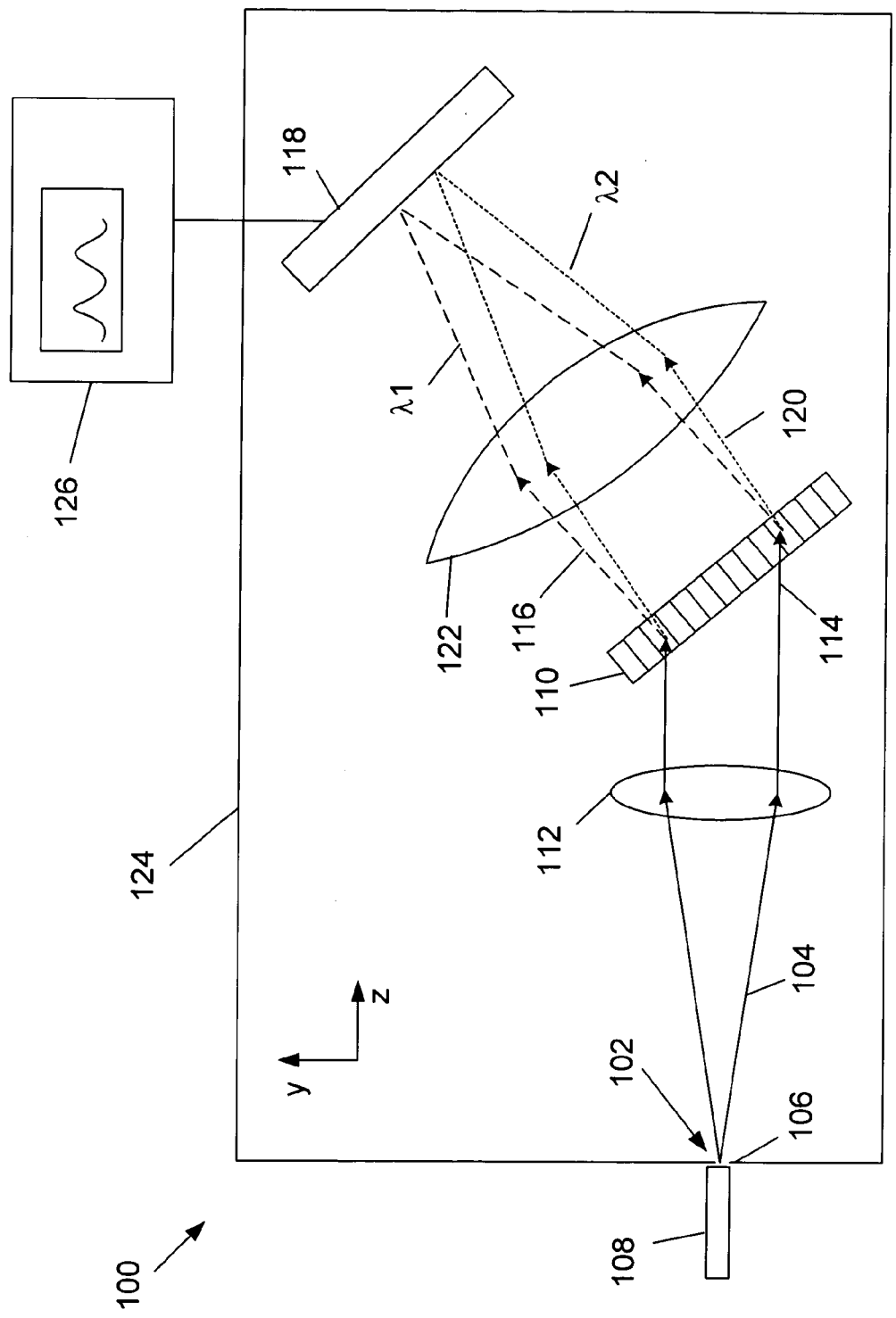
FIG. 1 schematically illustrates the optical layout of an embodiment of spectrometer that employs a transmissive diffractive element according to principles of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

An embodiment of a spectrometer 100 is schematically illustrated in FIG. 1. The spectrometer 100 has an input port 102 through which light 104 is introduced to the spectrometer 100. The input port 102 may include a slit 106, or an optical fiber 108, or a combination of both. An important function of the input port 102 is to provide some spatial restriction to the light 104 entering the spectrometer 100 so as to increase the resolution at the detector, since the input port 102 is typically imaged to the detector.

The light 104 passes from the input port 102 to a transmissive diffraction element 110, for example a diffraction grating. The divergence of the light 104 may be reduced by a first collimating unit 112. The first collimating unit 112 may comprise one or more lenses in combination. The first collimating unit 112 may collimate the light 104 so that the light 114 incident on the grating 110 is parallel. It is advantageous, although not necessary, that the first collimating unit 112 be achromatic, so that the divergence of the light 114 incident on the grating is uniform over a range of wavelengths. The first collimating unit 112 may also include one or more aspherical surfaces.

Light transmitted through the grating is 110 is diffracted, the angle of diffraction being dependent on the wavelength of the light 114 incident on the grating 110. The illustration shows light at two different wavelengths, $\lambda 1$ and $\lambda 2$, in the spectrometer 100. Further, for ease of understanding, light that propagates as a combination of wavelengths is shown with solid lines, light at the wavelength $\lambda 1$ is shown with a dashed line and light at $\lambda 2$ is shown with a dotted line. Light 116 at $\lambda 1$ is diffracted by the grating 110 to a first angle, and passes to the detector 118. Light 120 at $\lambda 2$ is diffracted by the grating 110 to a second angle and passes to the detector 118. The transmissive diffraction grating 110 diffracts light in a direction parallel to a diffraction plane, parallel to the y-z plane. Note that, for a transmissive diffraction grating, the diffraction plane is defined as being the plane of diffraction for transmitted light.

A focusing unit 122 is used to focus the light from the grating 110 to the detector 118. The spectrometer 100 may be enclosed within a housing 124 to reduce the amount of stray light incident on the detector 118. The housing may also provide the support (not shown) for the various optical elements within the spectrometer.

The detector 118 may be connected to an analyzer 126 for analyzing and/or displaying the signals detected by the detector. The analyzer 126 may be, for example, an optical spectrum analyzer or may be a computer with appropriate software for analyzing and displaying the detected signals.

In the illustrated embodiment, the detector 118 is an array detector, for example an array of photodiodes. Other types of detector may be used, for example a single detector that travels with a slit. In another embodiment, not illustrated, a single detector is fixed and the grating 110 rotates to change the wavelength of light incident on the detector. The detector 118 is typically positioned at the focal plane of the focusing unit 122.

The focusing unit 122 may be a single lens or a combination of two or more lenses. In the illustrated embodiment, the focusing unit 122 is a single, bi-convex lens. Where a single lens is used, the single lens may have one or both sides aspheric.

The light 114 is incident on the grating 110 at or around the Bragg angle in order to use the first order diffraction to separate different wavelengths. There exist reflected beams for each wavelength component present, corresponding to reflected diffraction orders. This is illustrated in FIG. 2A, which shows the light 114 incident on the grating 110 and the first order diffractively reflected light 202 and 204 for the wavelengths $\lambda 1$ and $\lambda 2$ respectively. It should be noted that, in FIG. 2A, the light transmitted through the grating 110 has been omitted.

The first order diffractively reflected light 202 and 204 passes through the first collimating unit 112 and is focused to the input port 102. The size of the focal spot produced by the first collimating unit 112 may depend on the angle at which the light travels through the first collimating unit 112. This is particularly important, for example, where the first collimating unit 112 includes an aspheric lens surface. Accordingly, the reflected light 202 and 204 may be defocused on reaching the plane of the input port 102.

The reflected light 202 and 204 may be further reflected, back towards the grating 110 from the input port 102, as illustrated in FIG. 2B. This figure only shows the path of light reflected from the input port 102 and, for clarity, does not show the light entering the spectrometer 100 through the input port 102. It will be appreciated that it need not only be the first order diffractively reflected light that is directed back to the input port: diffractively reflected from other diffraction orders may be directed back to the input port, depending on the wavelength of the light incident on the grating 110 and the angle at which the light 114 is incident on the grating 110.

The light 212 reflected from the input port 102 at $\lambda 1$ passes back through the first collimating unit 112 to the diffraction grating 110. The light 212 is then diffracted, and focused by the focusing unit 122 towards the detector 118. Likewise, the light 214 reflected from the input port 102 at $\lambda 2$ passes back through the first collimating unit 112 to the diffraction grating 110. The light 214 is then diffracted and focused towards the detector 118 by the focusing unit 122. The light 212 and 214 at the different wavelengths, $\lambda 1$ and $\lambda 2$, is directed to substantially the same position at the focal plane of the focusing unit 122, and so the light at $\lambda 1$ and $\lambda 2$ overlaps at the detector 118 to form a spot at position 126.

The light at the spot 126 is not dispersed, in other words, is independent of wavelength. The light at the spot 126 contributes to an undesirable background signal in the spectrometer. Various approaches may be used to reduce the intensity of the non-dispersed light at spot 126. For example, the surface of the housing 124 around the input port 102 may be made to absorb light, scatter light, or both. However, a residual non-dispersed signal may still remain even after the reflecting surface has been treated to reduce the amplitude of the non-dispersed light at the spot 126.

Another approach to reducing the amount of light in the non-dispersed spot 126 that is detected by the detector 118 is now described with reference to FIGS. 3A and 3B. It should be noted that the x and z axes shown in FIGS. 3A and 3B, and the y and z axes shown in FIGS. 1, 2A and 2B, correspond to a Cartesian co-ordinate system having x, y, and z as orthogonal axes.

FIG. 3A schematically illustrates a view of the spectrometer perpendicular to that illustrated in FIG. 2B. This figure shows light 214 at $\lambda 2$ reflected from the input port 102 being collimated in the first collimating unit 112 and being transmitted through the diffraction grating 110. Light at $\lambda 1$ is omitted from the figure for purposes of clarity. The focusing unit 122 focuses the light to the detector 118. The detector is shown as an array detector having a number of individual detector elements 318, having an active aperture with a transverse width, d. The active aperture corresponds to that width of the detector in which incident light causes a detection signal. The extent of the active aperture is normally set by the extent of the detector elements 318 themselves, in order to produce the largest signal. The extent of the active aperture may also be limited by covers overlapping the edges of the detector elements 318.

In FIG. 3A, the diffraction grating 110 is aligned so that the grooves 310 are perpendicular to the light incident from the input port 102. As a result, the point 302a from which the light 214 is reflected lies in the same plane as the light entering the input port 102, and so the reflected light 214 propagates in a direction parallel to the spectrometer axis 320. The plane of diffraction is a plane that coincides with the axis 320, but is perpendicular to the plane of the figure illustrated in FIG. 3A. The axis 320 is parallel to the z-axis.

In FIG. 3B, the light 104 from the input port 102 is not perpendicularly incident on the grooves 310 of the diffraction grating 110, because the grating has been turned through an angle a relative to the orientation shown in FIG. 3A. The light 316, from the input port 102 that is transmitted through the grating 110, is focused by the focusing unit 122 to the detector elements 318 of the detector 118. The light that is reflected from the grating, however, follows a different path. In the illustration, only the light 204 reflected at $\lambda 2$ is shown, although it will be appreciated that the following description is also applicable to light reflected at other wavelengths. Due to the tilt of the grating 110, the reflected light 204 is reflected off the axis 320, in a direction non-parallel to the plane of diffraction. Consequently, the light 204 is reflected at a point 302b that is off the axis 320, with the result that the light 204 reaches the detector 118 at a position 326 that is also off the axis 320. If the angle $\alpha$ is sufficiently large, then the light 204 reaches the detector 118 at a position that is outside the detector elements 318, and so the reflected light 204 is not detected by the detector 118.

Thus, orienting the transmission diffraction grating 110 so that it reflects first order light in a direction non-parallel to the diffraction plane results in the non-dispersed light at spot 126 being moved off the detector, if the rotation is sufficiently large. The sufficiency of the rotation depends on various factors including, but not limited to, the physical size of the spectrometer 100; the width, d, of the detector elements 318; and the focusing powers of the first collimating unit 112 and the focusing unit 122. The rotation of the grating 110 may be only a few degrees.

In some situations, the reflected light 212 and 214 is reflected by the surroundings of the input port 102. For example, where the input port is a slit in a material, for example a metal, the light 212 and 214 may be reflected by the material surrounding the slit. Where the input port 102 is a fiber, the light 212 and 214 may be reflected at the fiber face, or may result from a reflection of light that has passed back down the fiber from the grating 110. It is important to understand that it is not important from where the light 212 and 214 is reflected back to the grating 110, but that the light 212 and 214 originated by reflection off the grating 110. It should also be appreciated that this technique may be used to counteract the deleterious effects of light diffusely reflected from the input plane and/or its surroundings, in addition to light specularly reflected.

In one particular embodiment of the spectrometer 100, the input port 102 is formed by an input slit, for example having a slit size 70 μm×500 μm. The first collimating unit 112 may be any suitable lens unit, for example a Melles Griot, model no. LA0019 achromat having a focal length of 25 mm. The collimating unit 112 may also comprise a reflective surface.

The grating may be formed by etching any type of transmissive material, such as glass, for example BK7 glass, quartz, fused silica, or the like. In one particular embodiment, the transmissive diffraction grating is formed by etching a set of lines at a pitch of 621.855 lines/mm. One suitable type of focusing unit 122 is a bi-aspheric lens. In one particular embodiment, the bi-asphere has the following characteristics: decentered 2.2 mm, and center thickness of 12.3 mm. The first surface of the bi-asphere has a radius of curvature of 18.462 mm and a conic constant of −1.015629. The second surface of the bi-asphere has a radius of curvature of −19.7 mm and a conic constant of −4.307554. All aspheric coefficients of the first and second surfaces of the bi-asphere are zero. It will be appreciated that this is simply an example of one suitable lens for use in the focusing unit 122, and is not meant to limit the invention in any way. In addition, the focusing unit 122 may comprise a reflecting surface.

In one embodiment, the detector 118 includes a photodiode array having elements 318 that have a width, d, of 500 µm, and a center-to-center spacing of 25 µm. The photodiode array elements may be formed from any suitable type of semiconductor material for detecting the light analyzed in the spectrometer. For example, where the light is visible or in the near-infrared, the photodiode array elements may be formed from silicon, gallium arsenide or a gallium arsenide alloy. It will be appreciated that other types of detector material may also be used.

The spectrometer may also include various baffles, screens and the like to reduce stray light within the housing. For example, there may be one or more baffles along the optical path between the input port and the detector. Furthermore, there may be absorbing screens or baffles to deflect and/or absorb light in unwanted diffraction orders from the diffraction grating. For example, there may be an absorbing screen positioned to absorb zero order light transmitted through the diffraction grating. Absorbing baffles and screens may be made from any suitable absorbing material: black anodized aluminum is a useful material for this purpose, although other materials may also be used.

The spectrometer may operate in a wide variety of wavelength ranges. For example, the spectrometer may be an ultraviolet spectrometer, measuring light over the range of 200 nm–400 nm or into the visible region. The spectrometer may also cover parts of the visible or the infrared region of the spectrum. For example, the spectrometer may be a near infrared spectrometer with a range of 900 nm–1700 nm. In many cases, the minimum wavelength range of the spectrometer is higher than 100 nm.

It is important in a transmission spectrometer that the temperature-related spatial movement of the spectrally separated and focused light at the focal plane be reduced, so that detected signal is not significantly temperature dependent.

One important factor in controlling the temperature dependence of the detected signal is the thermal expansion coefficient of the diffraction grating. Expansion and contraction of the grating directly results in a change in the grating period, which results in a change in the positions of different wavelengths of light at the detector 118. This effect may be reduced by forming the grating in a material having relatively low thermal expansion coefficient, such as fused silica. The thermal expansion coefficient of fused silica is low, at about $0.55 \times 10^{-6}$ K$^{-1}$. For example, where the grating pitch is 621.855 lines/mm, the pitch decreases to 621.828 lines/mm if the temperature is increased by 80° C.

The grating is normally mounted on a frame in the housing. If the frame is made from a material having the same or similarly low thermal expansion coefficient, then problems associated with the relative thermal expansion between the grating and the frame are reduced. It is difficult and/or expensive, however, to manufacture the frame from fused silica or another low thermal expansion material, such as INVAR. It is often more convenient, and less expensive, to manufacture the frame from a metal, such as titanium, stainless steel or aluminum. These metals, however, have a thermal expansion coefficient that is many times higher than fused silica. For example, titanium has a thermal expansion coefficient of about $9 \times 10^{-6}$ K$^{-1}$, stainless steel has a thermal expansion coefficient of about $16 \times 10^{-6}$ K$^{-1}$, while aluminum has a thermal expansion coefficient of about $25 \times 10^{-6}$ K$^{-1}$.

Figure 4A:
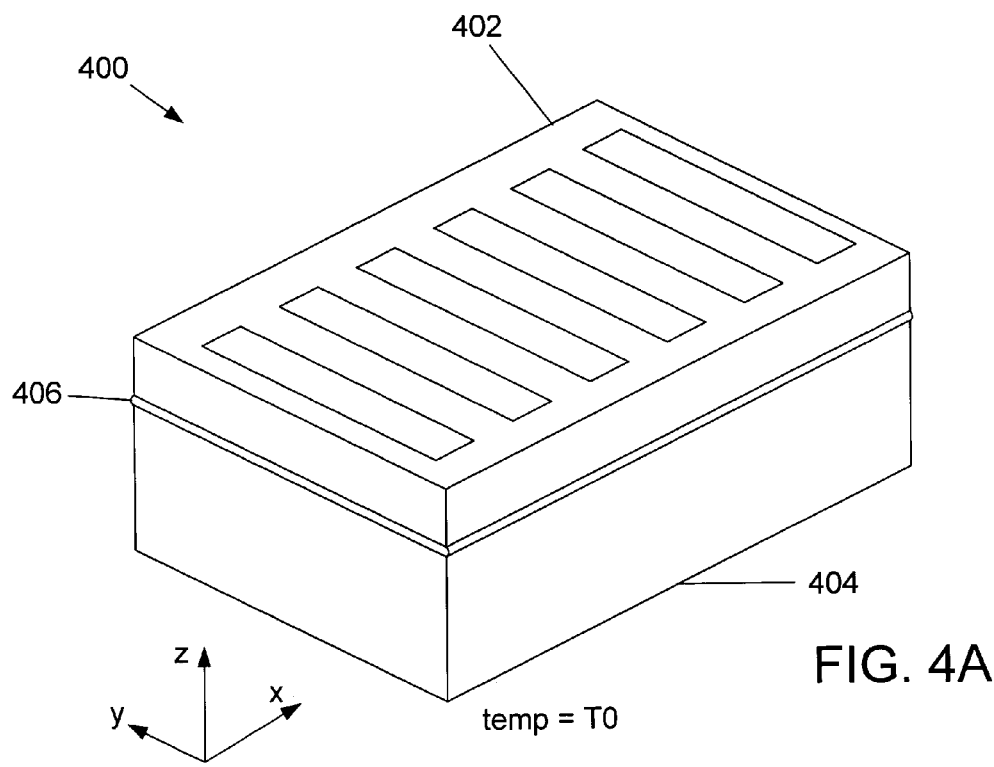
FIG. 4A schematically illustrates a perspective view of an embodiment of a grating unit.
Figure 4B:
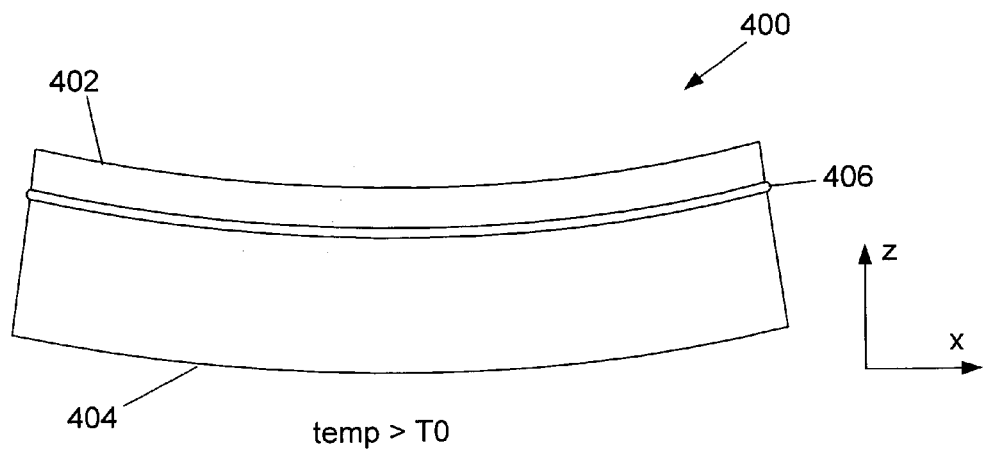
FIG. 4B schematically illustrates a side view of the grating unit of FIG. 4A warping under differential thermal expansion.

A conventional approach for making a grating unit 400 is schematically illustrated in FIG. 4A. The grating unit 400 includes a grating 402 mounted to a frame 404 with a line of adhesive 406 along its edges. When the temperature is changed, the frame 404 and the grating 402 expand or contract at different rates, with the result that the grating 402 becomes warped or stretched, for example as shown in FIG. 4B. In the illustration, the frame 404 has expanded by more than the grating 402, with the result that the grating 402 becomes distorted: the adhesive is typically not very elastic, and rigidly binds the grating 402 to the frame 404. When this happens, the period of the grating 402 changes by an amount controlled more by the thermal expansion coefficient of the frame material than the grating material.

Figure 5A:
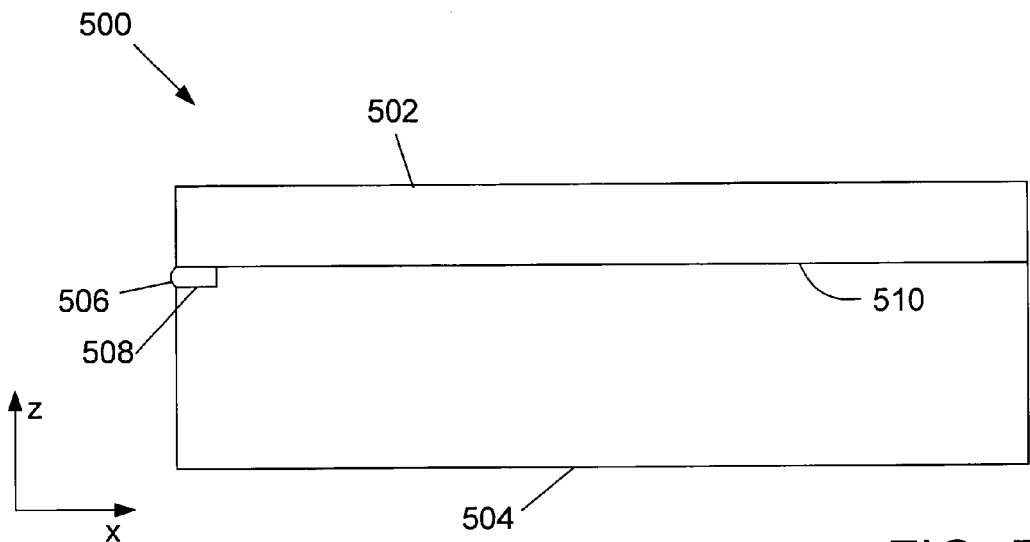
FIGS. 5A and 5B schematically illustrate a side view of an embodiment of a grating unit according to principles of the present invention.

One approach for overcoming this temperature dependent behavior is now discussed with reference to FIG. 5A. A grating unit 500 has a grating 502 fixedly attached to the frame 504 at only one position along the frame 504. For example, the grating 502 may be attached to the frame 504 using adhesive 506 applied at only one position along the frame 504. The point of attachment may be anywhere along the length of the frame 504, for example at the end of the frame 504 (illustrated) or somewhere in the middle portion of the frame 504 (not illustrated). The adhesive 506 may be applied in a notch 508 in the frame 504 to permit the lower surface 512 of the grating 502 to sit on flat on the upper side 510 of the frame 504.

Figure 5B:
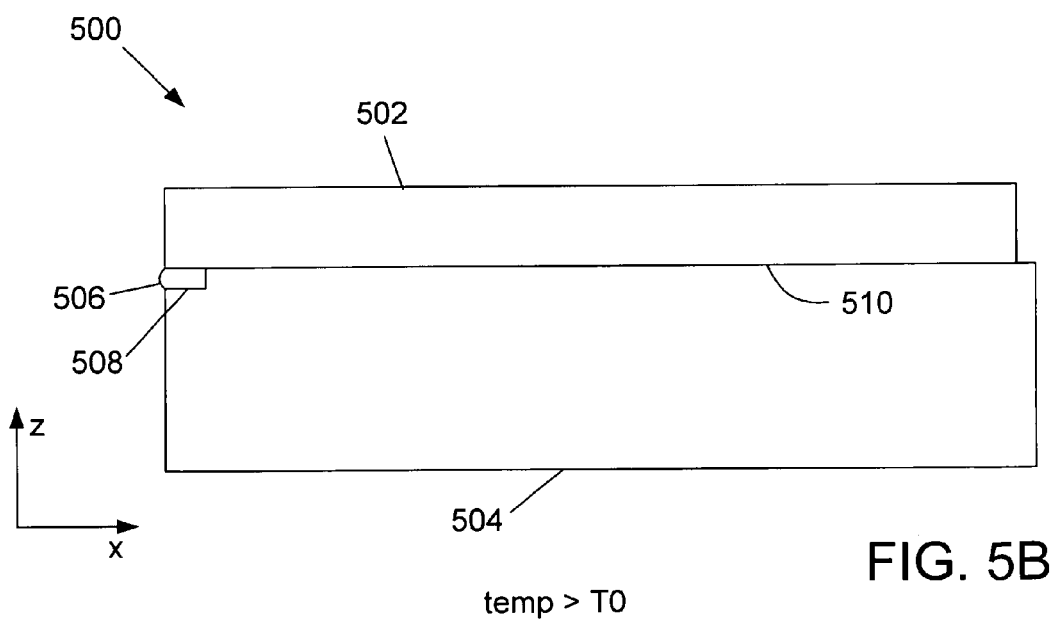

This approach permits independent expansion and contraction of the grating 502 and the frame 504, without warping or stretching the grating 502. An example of the independent expansion is schematically illustrated in FIG. 5B, which shows the grating unit 500 under a temperature that is higher than the temperature associated with FIG. 5A. The thermal expansion of the frame 504 is assumed to be greater than for the grating 502. The right hand end of the frame 504 has extended beyond the end of the grating 502 under higher temperatures, but the grating 502 has not distorted or stretched because the expansions of the grating 502 and the frame 504 are independent. It will be appreciated that the size of the thermal expansion under realistic temperature changes is significantly smaller than the scale of expansion illustrated in FIG. 5B. The diffraction grating mounted so as to expand and contract independently of the frame may be a transmissive grating or may be a reflective grating.

It is noted that, in order to reduce warping or stretching of the grating, and thus reduce temperature dependent changes in the effective grating period, it is important to provide independent thermal expansion and contraction in a direction across the grooves, shown as the x-direction in FIG. 4. It is less important, however, to provide for independent thermal expansion and contraction in the direction parallel to the grooves, shown in FIG. 4 as the y-direction (the co-ordinate system shown in FIG. 4 does not correspond to the co-ordinate system shown in FIGS. 1–3). Warping or stretching in the direction parallel to the grooves does not result in a change in the effective pitch of the grooves, and so the effects of warping or stretching in the direction parallel to the grooves is less deleterious to the spectrometer's performance than for warping or stretching in the direction across the grooves.

Figure 6A:
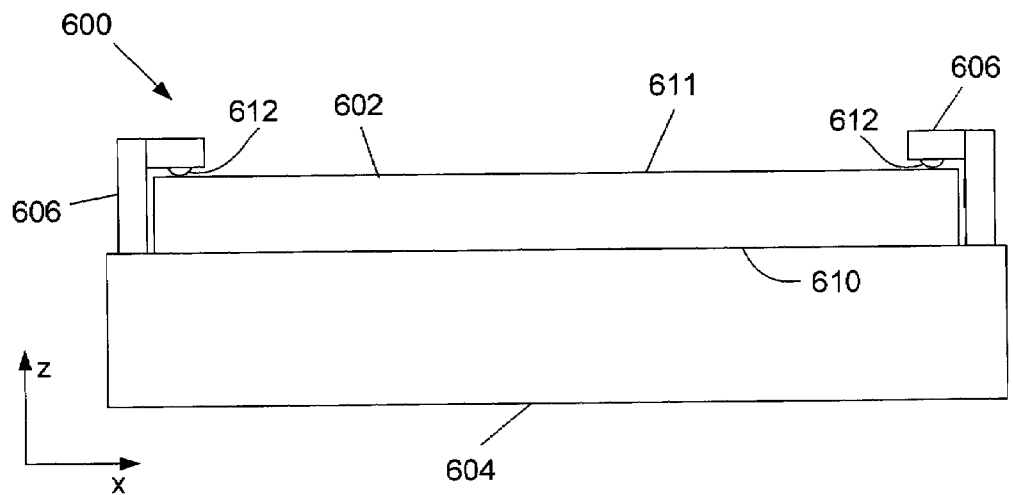
FIGS. 6A and 6B schematically illustrate a side view of another embodiment of a grating unit according to principles of the present invention FIG. 7 schematically illustrates a side view of another embodiment of a grating unit according to principles of the present invention.

Other approaches to achieving independent thermal expansion and contraction may also be used, one of which is illustrated in FIG. 6A. The grating unit 600 may have the grating 602 held against the frame 604 using a method that prevents movement of the grating 602 relative to the frame 604 under normal operating conditions at constant temperature, but which permits the grating 602 to slip relative to the frame 604 under changing temperature conditions. One such method is to use a clip 606, or, multiple clips 606, to hold the grating 602 to the frame 604. It is important that the clips hold the grating against the upper surface 610 of the frame without significantly distorting the grating 602.

Figure 6B:
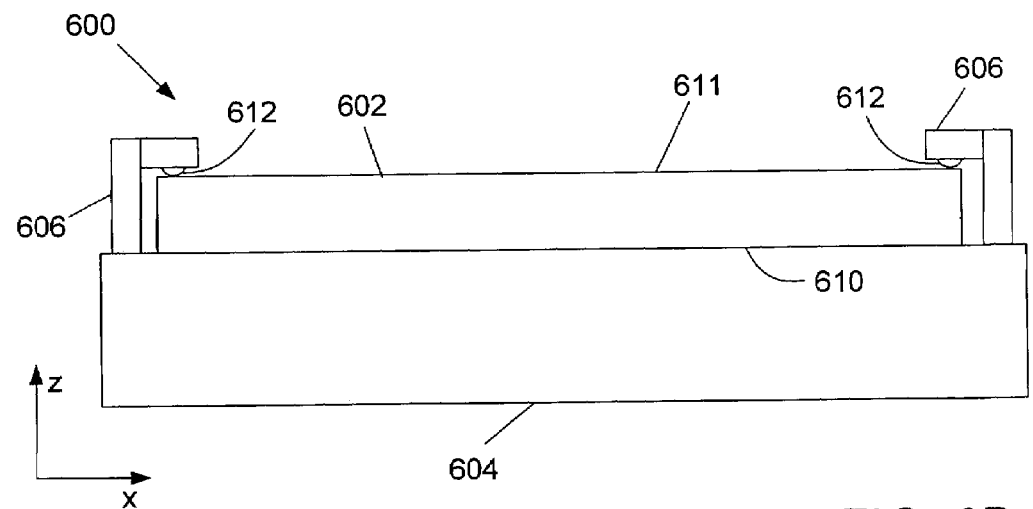

When the temperature rises, the frame 604 experiences a larger thermal expansion than the grating 602. This situation is schematically illustrated in FIG. 6B—note that the gaps between the clips 606 and the grating 602 are larger at the higher temperature. The clips 606 are designed to be able to move on the upper surface 611 of the grating 602 without significantly distorting or stretching the grating 602. To achieve this, the contact points 612 of the clips may be formed of a deformable material, such as a polymer. The contact points 612 may, in addition, be formed of a material having a low coefficient of friction, for example Teflon.

Figure 7:
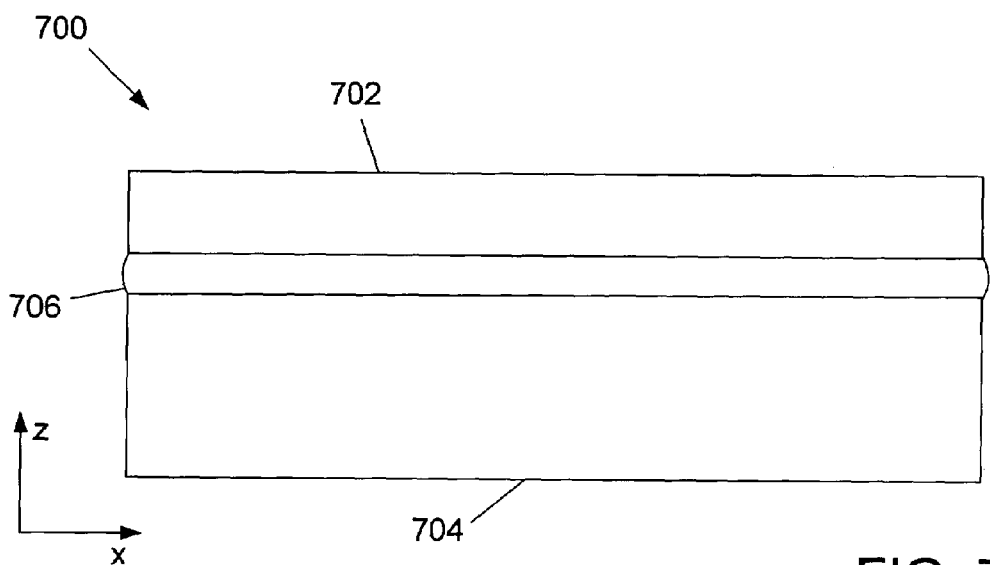

Another approach to permitting independent thermal expansion contraction of the grating and the frame is schematically illustrated in FIG. 7, which shows a grating unit 700 with a grating 702 attached to a frame 704 via a layer 706 of an elastic adhesive. The elastic adhesive 706 may be, for example, an elastomer, or a flexible epoxy such as EPO-TEK® 310, available from Epoxy Technology, Billerica, Mass. The elastic adhesive 706 is preferably made sufficiently thick that, over the anticipated operating temperature range, the thermal expansion of the grating 702 is close to a value that would be calculated from the thermal expansion coefficient of the grating material alone. For example, over a temperature range of no more than 80K, the thermal expansion of the grating 702 may be within a factor of three of that of the grating material alone, and in fact may be approximately equal to that of the grating material alone. In illustration, the effective thermal expansion of a fused silica grating mounted on the frame is less than $1.65 \times 10^{-6}$ $K^{-1}$ over a temperature range of no more than 80 K.

Figure 8:
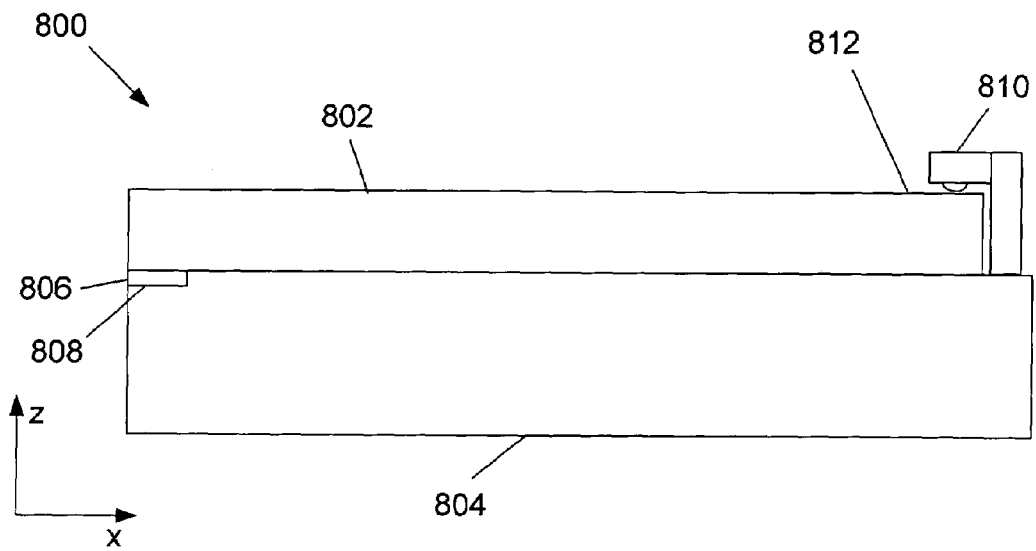
FIG. 8. schematically illustrates a side view of another embodiment of a grating unit according to principles of the present invention.

It will be appreciated that other approaches to maintaining independent thermal expansion of the grating and the frame may be used. Furthermore, different combinations of such approaches may also be employed. For example, as is schematically illustrated in FIG. 8, a grating unit 800 may use a combination of adhesive and clips to hold the grating 802 to the frame 804. In the illustrated embodiment, the grating 802 is attached to the frame 804 via a short portion of adhesive 806, preferably positioned within a notch 808. One or more clips 810 may also be used to the grating 802 to the frame 804. This arrangement may be particularly useful where there is at least one clip 810 holding the end 812 of the grating 802 that is free from the adhesive 806.

It will be appreciated that other arrangements may be possible, for example the adhesive 806 may be positioned mid-way along the frame 804, with clips 810 positioned at each end of the grating 802.

Permitting the grating and the grating frame to thermally expand independently of each other allows for a very low thermal dependence on the wavelength shift at the detector. For example, by implementing the invention described herein, the wavelength detected at the detector may shift by 0.01 nm $K^{-1}$, or as little as 0.005 nm $K^{-1}$, thus enabling accurate operation over a wide temperature range.

Figure 9:
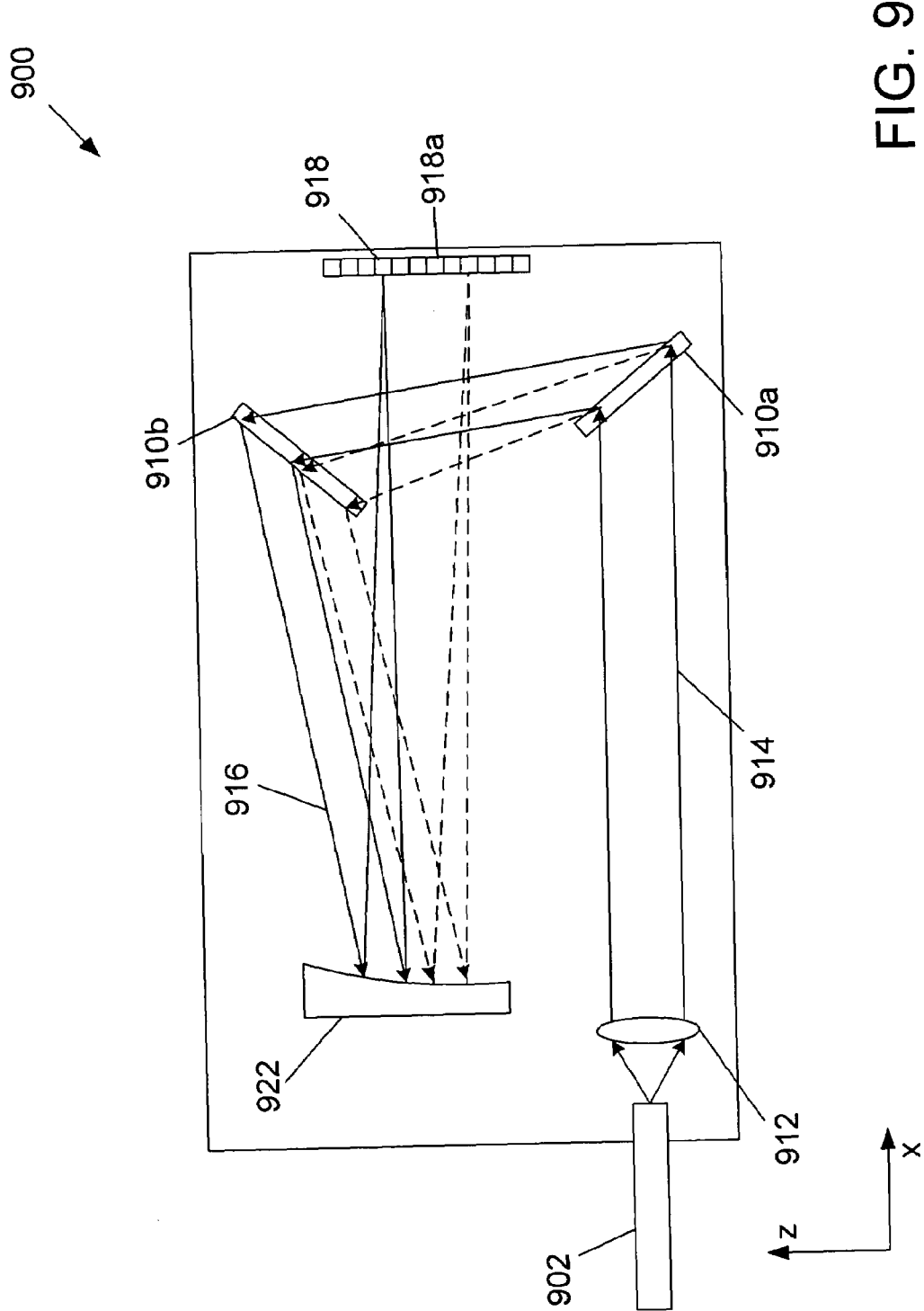
FIG. 9 schematically illustrates an embodiment of a dual-grating transmission spectrometer according to principles of the present invention.

It will be further appreciated that the inventions described herein may be implemented in different configurations of transmissive spectrometers. For example, the spectrometer may use more than one transmissive grating, an example of such spectrometer 900 being schematically illustrated in FIG. 9. Light 904 is input to the spectrometer 900 through an input port 902, illustrated in this particular embodiment as an optical fiber. The light 904 is collimated using in a first lens unit 912. The collimated light 914 is diffracted by a first transmissive diffracting element 910a and then by a second diffracting element 910b. The doubly diffracted light 916 is focused by a focusing unit 922, in this case a mirror, to a detector unit 918. The focusing unit 922 may be a spherical mirror, or may be an aspherical mirror. The detector unit 918 may be a detector array having a number of detector elements 918a.

Each of the transmissive diffracting elements 910a and 910b may reflect light backwards towards the input port 902. Therefore, in a manner like that described earlier with regards to FIG. 3B, either or both of the transmissive diffracting elements 910a and 910b may oriented to reflect light out of the diffraction plane, equivalently out of the y-z plane. Consequently, the reflected light, upon being reflected back through the transmissive diffracting elements 910a and 910b, is diverted away from the detector unit 918 and so the effects of the non-dispersed light on the detector signal is reduced.

Furthermore, one or both of the transmissive diffracting elements 910a and 910b may be mounted on respective grating frames in a manner as described above to permit independent thermal expansion of the diffractive element and the frame. It will further be appreciated that a spectrometer may also use more than two diffracting elements.

The present invention is applicable to spectrometers that use a transmissive diffraction grating, and is believed to be particularly useful for reducing background noise in the detected signal and for increasing the ability of the spectrometer to operate over a wide range of temperatures. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. An optical spectrometer, comprising:
   an input port;
   an optical detector;
   at least a first transmissive diffraction grating disposed to diffract light received from the input port to the optical detector, light from the input port being diffracted parallel to a diffraction plane, the first transmissive diffraction grating being oriented so that light reflected by the first transmissive diffraction grating is reflected in a direction non-parallel to the diffraction plane; and
   a first focusing unit disposed between the first transmissive diffraction grating and the optical detector, the first focusing unit focusing light from the first transmissive diffraction grating to the optical detector.

2. A spectrometer as recited in claim 1, wherein the input port includes a slit.

3. A spectrometer as recited in claim 1, wherein the input port includes an optical fiber.

4. A spectrometer as recited in claim 1, wherein an angle between a direction of reflection and the diffraction plane is greater than 1°.

5. A spectrometer as recited in claim 1, wherein the first focusing unit comprises at least one aspherical surface for focusing the light.

6. A spectrometer as recited in claim 1, further comprising a collimating unit between the input port and the first transmissive diffraction grating.

7. A spectrometer as recited in claim 6, wherein the collimating unit comprises an achromatic lens system.

8. A spectrometer as recited in claim 6, wherein the collimating unit comprises at least one aspheric optical surface.

9. A spectrometer as recited in claim 6, wherein the collimating unit is positioned at a distance from the input port such that light passing from the collimating unit to the first transmissive diffraction grating is collimated.

10. A spectrometer as recited in claim 1, wherein the optical detector comprises an array of detector elements.

11. A spectrometer as recited in claim 1, wherein the optical detector has a detector width, and an angle between a direction of reflection and the diffraction plane is selected so that the light reflected from the transmissive diffraction grating that is also reflected back through the transmissive diffraction grating reaches a focal plane of the first focusing unit separated from signal light at the detector by at least one half of the detector width.

12. A spectrometer as recited in claim 1, wherein the first transmissive diffraction grating is attached to a grating frame by a mounting, the mounting of the transmissive diffraction grating permitting independent expansion and contraction of the transmissive diffraction grating and the frame under conditions of changing temperature.

13. A spectrometer as recited in claim 12, wherein the mounting comprises a portion of adhesive located at a selected position along the grating frame.

14. A spectrometer as recited in claim 12, wherein the mounting comprises at least one or more clips holding the first transmissive diffraction grating to the frame.

15. A spectrometer as recited in claim 12, wherein the mounting comprises an elastic adhesive positioned along the frame between the frame and the first transmissive diffraction grating.

16. A spectrometer as recited in claim 1, further comprising an analyzer coupled to the detector to analyze detection signals produced by the detector.

17. A spectrometer as recited in claim 1 further comprising at least a second transmissive diffraction grating positioned on an optical path between the input port and the optical detector.

18. An optical spectrometer, comprising:
an input port;
an optical detector defining an active aperture;
at least a first transmissive diffraction grating disposed to diffract light received from the input port to the optical detector; and
a first focusing unit disposed between the first transmissive diffraction grating and the optical detector, the first focusing unit focusing light from the first transmissive diffraction grating to the optical detector;
wherein the first transmissive diffraction grating is oriented so that light, reflected from the transmissive diffraction grating and reflected back through the transmissive diffraction grating, reaches a focal plane of the first focusing unit outside the active aperture.

19. A method of aligning a spectrometer having at least a first transmissive diffraction grating, comprising;
passing light from an input port to the first transmissive diffraction grating;
diffracting the light in a diffraction plane by the first transmissive diffraction grating;
focusing the light diffracted by the first transmissive diffraction grating to a detector defining an active aperture; and
orienting the first transmissive diffraction grating so that light reflected by the first transmissive diffraction grating is reflected out of the diffraction plane.

20. A method as recited in claim 19, further comprising collimating the light passing from the input port to the first transmissive diffraction grating.

21. A method as recited in claim 19, further comprising selecting an angle between the light reflected by the first transmissive diffraction grating and the diffraction plane so that the light, reflected by the first transmissive diffraction grating and reflected back through the first transmissive diffraction grating, is focused to a position outside the active aperture.

22. A method as recited in claim 19, further comprising analyzing detection signals produced by the detector.

23. A method as recited in claim 22, further comprising displaying the analyzed signals.

24. A spectrometer, comprising;
an input port;
an optical detector;
at least a first diffraction grating unit disposed to diffract light received from the input port to the optical detector, light from the input port being diffracted parallel to a diffraction plane, the first diffraction grating unit comprising a diffraction grating attached to a frame using a mounting, the mounting permitting independent thermal expansion and contraction of the grating and the frame under conditions of changing temperature; and
a first focusing unit disposed between the optical detector and the first diffraction grating unit, the first focusing unit focusing diffracted light from the first diffraction grating unit to the optical detector.

25. A spectrometer as recited in claim 24, wherein the mounting comprises a portion of adhesive at a position along the grating frame.

26. A spectrometer as recited in claim 25, wherein the portion of adhesive is disposed at one end of the grating frame.

27. A spectrometer as recited in claim 25, wherein the portion of adhesive is disposed in a notch on the frame so as to permit a lower surface of the diffraction grating to mate with an upper surface of the grating frame.

28. A spectrometer as recited in claim 25, further comprising one or more clips holding the transmissive diffraction grating to the grating frame.

29. A spectrometer as recited in claim 24, wherein the mounting comprises one or more clips holding the diffraction grating to the grating frame.

30. A spectrometer as recited in claim 24, wherein the mounting comprises a layer of elastic adhesive disposed between the grating and the grating frame.

31. A spectrometer as recited in claim 24, wherein the diffraction grating is disposed at an angle to reflect light in a direction nonparallel to the plane of the diffraction.

32. A spectrometer as recited in claim 24, wherein the diffraction grating comprises a transmissive diffraction grating.

33. A spectrometer as recited in claim 24, wherein the diffraction grating comprises a reflective diffraction grating.

34. A spectrometer as recited in claim 24, further comprising a first collimating unit between the input port and the first diffraction grating unit.

35. A spectrometer as recited in claim 34, wherein the first collimating unit comprises an achromatic lens system.

36. A spectrometer as recited in claim 34, wherein the first collimating unit is positioned at a distance from the input port such that fight from the input port is collimated by the first collimating unit.

37. A spectrometer as recited in claim 24, wherein the optical detector comprises an array of detector elements.

38. A spectrometer as recited in claim 24, wherein the optical detector defines an active aperture, and the first transmissive diffraction grating is oriented so that a direction of reflection off the first transmissive diffraction grating is such that light reflected by the first transmissive diffraction grating and reflected back through the first transmissive diffraction grating reaches the focal plane of the first focusing unit outside the active aperture of the optical detector.

39. A spectrometer as recited in claim 24, further comprising an analyzer coupled to the detector to analyze detection signals produced by the detector.

40. A spectrometer as recited in claim 24, further comprising at least a second transmissive diffraction grating unit disposed on an optical path between the input port and the optical detector.

41. A method of mounting a diffraction grating to a frame having a thermal expansion coefficient substantially different from that of the diffraction grating, comprising;
attaching the diffraction grating to the frame to permit independent thermal expansion and contraction of the diffraction grating and the frame under conditions of changing temperature.

42. A method as recited in claim 41, wherein attaching the diffraction grating to the frame comprises attaching the diffraction grating to the frame using a portion of adhesive at a position along the grating frame.

43. A method as recited in claim 42, further comprising placing the portion of adhesive at one end of the grating frame.

44. A method as recited in claim 42, further comprising placing the portion of adhesive in a notch on the grating frame so as to permit a lower surface of the diffraction grating to mate with an upper surface of the grating frame.

45. A method as recited in claim 41, wherein attaching the diffraction grating to the frame comprises clipping the diffraction grating to the grating frame using one or more clips.

46. A method as recited in claim 41, wherein attaching the diffraction grating to the frame comprises attaching the diffraction grating to the frame using an elastic adhesive.

47. A method as recited in claim 41, wherein the diffraction grating is a transmissive diffraction grating.

48. A method as recited in claim 41, wherein the diffraction grating is a reflective diffraction grating.

49. A spectrometer, comprising;
an input port;
an optical detector;
at least a first transmissive diffraction grating unit disposed to diffract light received from the input port to the optical detector, the first transmissive diffraction grating unit comprising a transmissive diffraction grating attached to a frame using a mounting; and
a first focusing unit disposed between the optical detector and one or more transmissive diffraction grating units of the at least one transmissive diffraction grating unit, the first focusing unit focusing diffracted light to the optical detector;
wherein the temperature dependent wavelength shift of diffracted light at the optical detector is no more than 0.01 nm/K when the light received from the input port has a wavelength range greater than 100 nm.

50. A spectrometer as recited in claim 49, wherein the temperature dependent wavelength shift of diffracted light at the optical detector is no more than 0.005 nm/K.

51. A spectrometer as recited in claim 49, wherein the first transmissive diffraction grating is formed in fused silica.

52. A spectrometer as recited in claim 49, further comprising at least a second transmissive diffraction grating unit disposed on an optical path between the input port and the optical detector.

* * * * *